United States Patent
Borah et al.

(10) Patent No.: US 9,886,337 B2
(45) Date of Patent: Feb. 6, 2018

(54) QUORUM BASED DISTRIBUTED ANOMALY DETECTION AND REPAIR USING DISTRIBUTED COMPUTING BY STATELESS PROCESSES

(71) Applicant: AppDynamics LLC, San Francisco, CA (US)

(72) Inventors: Gautam Borah, Fremont, CA (US); Pankaj Gupta, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 126 days.

(21) Appl. No.: 14/815,216

(22) Filed: Jul. 31, 2015

(65) Prior Publication Data
US 2017/0031743 A1    Feb. 2, 2017

(51) Int. Cl.
*G06F 11/07*    (2006.01)
*G06F 9/48*    (2006.01)

(52) U.S. Cl.
CPC .......... *G06F 11/079* (2013.01); *G06F 9/4881* (2013.01); *G06F 11/0721* (2013.01)

(58) Field of Classification Search
CPC . G06F 11/008; G06F 11/2033; G06F 11/3433
USPC .................................. 714/4.11, 6.3
See application file for complete search history.

(56) References Cited

U.S. PATENT DOCUMENTS

| | | | | |
|---|---|---|---|---|
| 7,051,098 B2 * | 5/2006 | Masters | .................... | G06F 9/06 709/223 |
| 7,055,062 B2 * | 5/2006 | Shah | .................. | G05B 23/0224 714/15 |
| 7,509,518 B2 * | 3/2009 | Bailey | .................... | G06F 11/008 707/999.101 |
| 2008/0004841 A1 * | 1/2008 | Nakamura | ............ | G06F 11/008 702/186 |
| 2008/0005291 A1 * | 1/2008 | Bae | ........................ | G06F 9/5061 709/223 |
| 2008/0046500 A1 * | 2/2008 | Kato | ..................... | G06F 9/5044 709/201 |
| 2009/0013023 A1 * | 1/2009 | Kato | ........................ | G06F 9/505 709/201 |
| 2009/0089627 A1 * | 4/2009 | Matsubara | .......... | G06F 11/0709 714/48 |
| 2009/0144739 A1 | 6/2009 | Goel et al. | | |
| 2010/0039944 A1 * | 2/2010 | Matsubara | ............ | H04L 12/417 370/242 |
| 2012/0210160 A1 * | 8/2012 | Fuhrman | ............ | G05B 19/0428 714/4.12 |

(Continued)

OTHER PUBLICATIONS

International Search Report dated Nov. 2, 2015 in connection with PCT/US15/43205.

*Primary Examiner* — Chae Ko
(74) *Attorney, Agent, or Firm* — Parker Ibrahim & Berg LLC; James M. Behmke; Stephen D. LeBarron (57) ABSTRACT

Quorum based anomaly detection utilizes multiple entities to detect and attempt to configure a repair task for an anomaly. Once the repair task is generated, a system is used to assign the task to a worker entity while recording the responsibility of that task with the worker in a persistent storage. If the worker entity crashes, the degraded worker status will eventually be detected, and all tasks associated with that worker will be re-assigned. Once a worker finishes a task, the assignment information for the task is transitioned to a completed state.

21 Claims, 7 Drawing Sheets

(56) References Cited

U.S. PATENT DOCUMENTS

| | | | |
|---|---|---|---|
| 2013/0227334 A1* | 8/2013 | Wang | G06Q 10/08 |
| | | | 714/3 |
| 2014/0019598 A1 | 1/2014 | Krajec | |
| 2014/0019756 A1 | 1/2014 | Krajec | |
| 2014/0088866 A1* | 3/2014 | Knapp | G06Q 10/06 |
| | | | 701/467 |
| 2015/0378842 A1* | 12/2015 | Tomlinson | G06F 21/40 |
| | | | 380/28 |
| 2016/0125083 A1* | 5/2016 | Dou | G06F 17/30864 |
| | | | 707/709 |
| 2016/0352832 A1* | 12/2016 | Li | H04L 67/1097 |

* cited by examiner

QUORUM BASED DISTRIBUTED ANOMALY DETECTION AND REPAIR USING DISTRIBUTED COMPUTING BY STATELESS PROCESSES

BACKGROUND OF THE INVENTION

The World Wide Web has expanded to make various services available to the consumer as online web application. A multi-tiered web application is comprises of several internal or external services working together to provide a business solution. These services are distributed over several machines or nodes, creating an n-tiered, clustered on-demand business application. The performance of a business application is determined by the execution time of a business transaction; a business transaction is an operation that completes a business task for end users of the application. A business transaction in an n-tiered web application may start at one service and complete in another service involving several different server machines or nodes. For Example, reserving a flight ticket involves a typical business transaction "checkout" which involves shopping-cart management, calling invoicing and billing system etc., involving several services hosted by the application on multiple server machines or nodes. It is essential to monitor and measure a business application to provide insight regarding bottlenecks in communication, communication failures and other information regarding performance of the services that provide the business application.

A business application is monitored by collecting several metrics from each server machine or node in the system. The collected metrics are aggregated by service or tier level and then again aggregated by the entire application level. The metric processing involves aggregation of hierarchical metrics by several levels for an n-tier business application. In a large business application environment hundreds and thousands of server machines or nodes create multiple services or tiers, each of these nodes generate millions of metrics per minute.

If there is an anomaly in the metric processing system, for example in speed processors, a lot of data could be lost if the repair isn't implemented quickly. Loss of data, both in actually collected data as well as dropped scheduling of tasks to process data, may significantly impact the perceived health of a system and the ability to determine how a system is performing. What is needed is an improved method detecting and responding to anomalies that minimizes data loss and task tracking.

SUMMARY OF THE CLAIMED INVENTION

The present technology uses quorum based anomaly detection in which multiple entities may potentially detect and configure a repair task for an anomaly. Once the repair task is generated, a system is used to assign the task to a worker entity while recording the responsibility of that task with the worker in a persistent storage. If the worker entity crashes, the degraded worker status will eventually be detected, and all tasks associated with that worker will be re-assigned. Once a worker finishes a task, the assignment information for the task is transitioned to a completed state.

An embodiment may include a method for processing metrics. The method may begin by providing a group of collectors and a group of aggregators on one or more servers, wherein the group of collectors receiving metric data from a plurality of agents one or more remote servers and each of the aggregators receiving and aggregating selected metrics received from one or more collectors. An anomaly may be detected among the collectors and aggregators. A task based on the anomaly may be created by a producer of a plurality of producers that attempt to create the task. The task may then be assigned to a worker.

An embodiment may include a system for processing metrics. The system may include a processor, a memory and one or more modules stored in memory and executable by the processor. When executed, the one or more modules may provide a group of collectors and a group of aggregators on one or more servers, the group of collectors receiving metric data from a plurality of agents one or more remote servers and each of the aggregators receiving and aggregating selected metrics received from one or more collectors, detect an anomaly among the collectors and aggregators, create a task based on the anomaly by a producer of a plurality of producers that attempt to create the task, and assign the task to a worker.

DETAILED DESCRIPTION

The present technology processes a large volume of real time hierarchical system metrics using distributed computing by stateless processes. The metrics processing system receives different types of hierarchical metrics coming from different sources and then aggregates the metrics by their hierarchy. The system is on-demand, cloud based, multi-tenant and highly available. The system makes the aggregated metrics available for reporting and policy triggers in real time.

The metrics aggregation system involves two different classes of stateless java programs, collectors and aggregators, which work in tandem to receive, aggregate and roll up the incoming metrics. The aggregators and collectors may be upgraded to new versions with minimal loss in data.

A quorum based anomaly detection in which multiple entities may potentially detect and configure a repair task for an anomaly. Once the repair task is generated, a system is used to assign the task to a worker entity while recording the responsibility of that task with the worker in a persistent storage. If the worker entity crashes, the degraded worker status will eventually be detected, and all tasks associated with that worker will be re-assigned. Once a worker finishes a task, the assignment information for the task is transitioned to a completed state.

Figure 1:
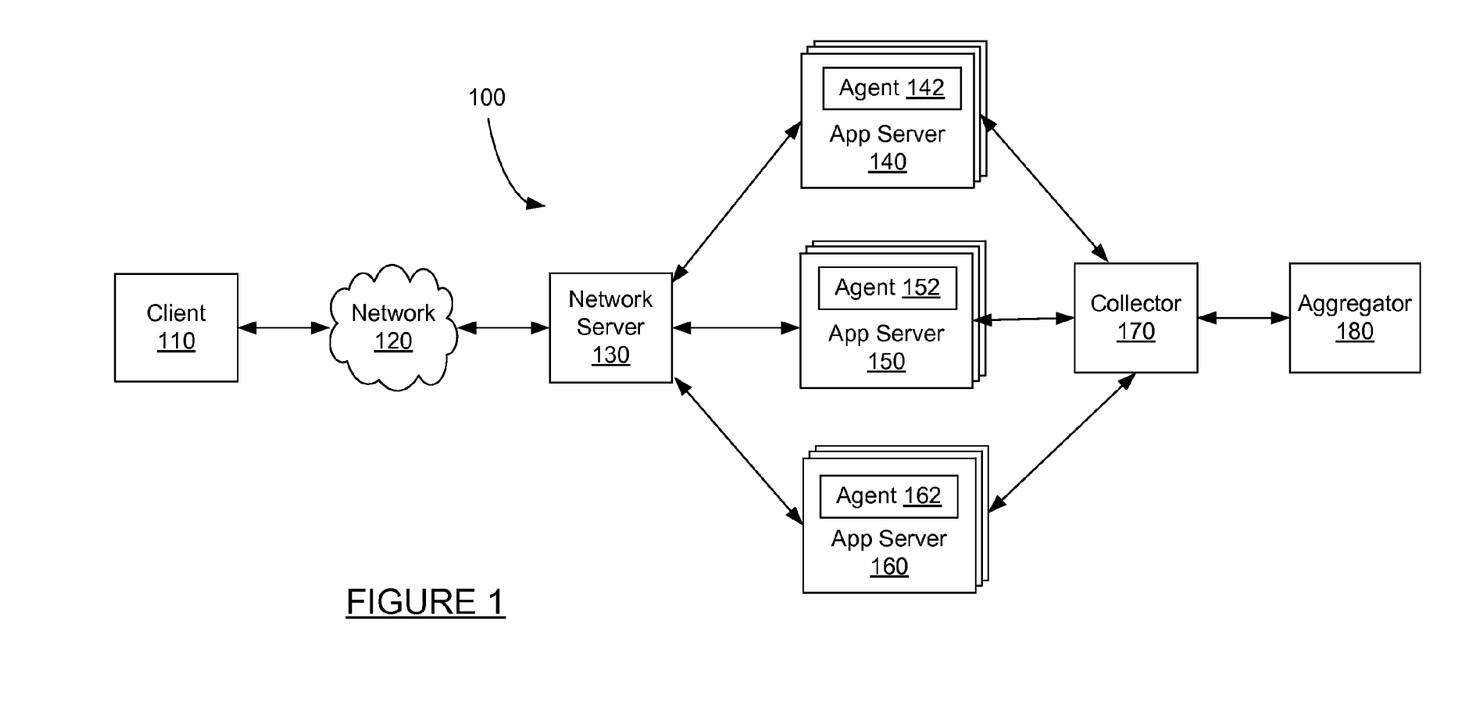
FIG. 1 is a block diagram of a system for aggregating data and handling anomalies.

FIG. 1 is a block diagram of a system for aggregating data. The system of FIG. 1 includes client 110, network server 130, application servers 140, 150 and 160, collector 170 and aggregator 180. Client 110 may send requests to and receive responses from network server 130 over network 120. In some embodiments, network server 130 may receive a request, process a portion of the request and send portions of the request to one or more application servers 140-150. Application server 140 includes agent 142. Agent 142 may execute on application server 140 and monitor one or more functions, programs, modules, applications, or other code on application server 140. Agent 142 may transmit data associated with the monitored code to a collector 170. Application servers 150 and 160 include agents 152 and 162, respectively, and also transmit data to collector 170. More detail for a system that monitors distributed business transactions and reports data to be collected and aggregated is disclosed in U.S. patent application Ser. No. 12/878,919, titled "Monitoring Distributed Web Application Transactions," filed Sep. 9, 2014, the disclosure of which is incorporated herein by reference.

Collector 170 may receive metric data and provide the metric data to one or more aggregators 180. Collector 170 may include one or more collector machines, each of which using a logic to transmit metric data to an aggregator 180 for aggregation. Aggregator 180 aggregates data and provides the data to a cache for reports to external machines. The aggregators may operation in a ring, receiving metric data according to logic that routes the data to a specific aggregator. Each aggregator may, in some instances, register itself with a presence server.

More details for collecting and aggregating metrics using a collector and aggregator is discussed in U.S. patent application Ser. No. 14/448,977, titled "Collection and Aggregation of Large Volume of Metrics, filed on Jul. 31, 2014, the disclosure of which is incorporated herein by reference.

Figure 2:
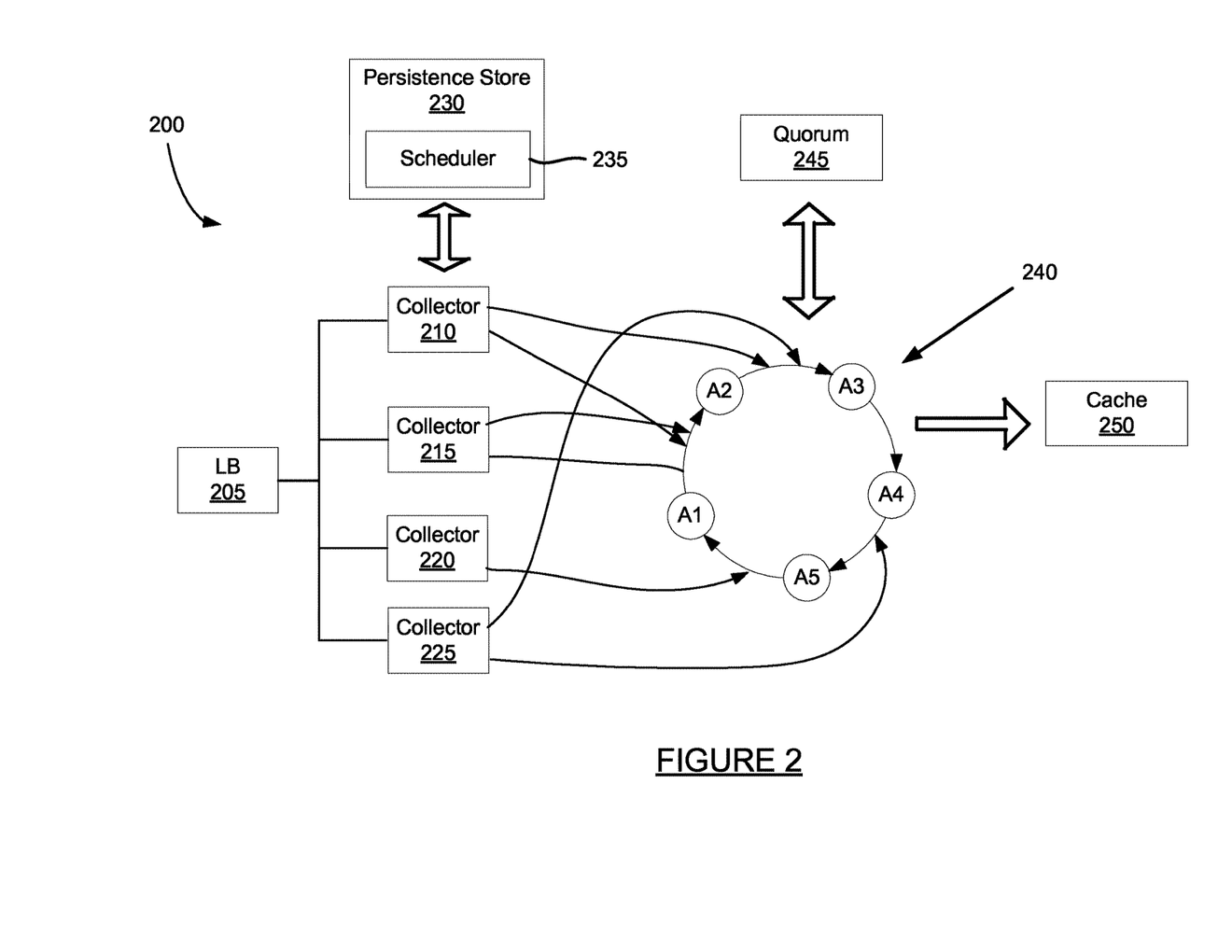
FIG. 2 is a block diagram of a collector and aggregator.

FIG. 2 is a block diagram of a collector and aggregator. The system of FIG. 2 includes load balancer 205, collectors 210, 215, 220 and 225, a persistence store 230, and aggregators 240 (A1-A5). The system of FIG. 2 also includes quorum 245 and cache 250. Agents on application servers may transmit metric data to collectors 210-225 through load balance machine 205. In some embodiments, the metrics are sent from the agent to a collector in a table format for example once per minute.

The collectors receive the metrics and use logic to route the metrics to aggregators. The logic may include determining a value based on information associated with the metric, such as a metric identifier. In some instances, the logic may include performing a hash on the metric ID. The metric may be forwarded to the aggregator based on the outcome of the hash of the metric ID. The same hash is used by each and every collector to ensure that the same metrics are provided to the same aggregator.

The collectors may each register with quorum 245 when they start up. In this manner, the quorum may determine when one or more collectors is not performing well and/or fails to register.

A persistence store 230 stores metric data provided from the collectors to the aggregators. The persistence store may include scheduler 235. Scheduler 235 may handle tasks generated and executed to resolve anomalies in the system of FIG. 2. More details for scheduler 235 are provided with respect to FIG. 3.

Each aggregator may receive one or more metric types, for example two or three metrics. The metric information may include a sum, count, minimum, and maximum value for the particular metric. An aggregator may receive metrics having a range of hash values. The same metric type will have the same hash value and be routed to the same aggregator. An aggregator may become a coordinator. A coordinator may check quorum data and confirm persistence was successful.

Once aggregated, the aggregated data is provided to a cache 250. Aggregated metric data may be stored in cache 250 for a period of time and may eventually be flushed out. For example, data may be stored in cache 250 for a period of eight hours. After this period of time, the data may be overwritten with additional data.

Figure 3:
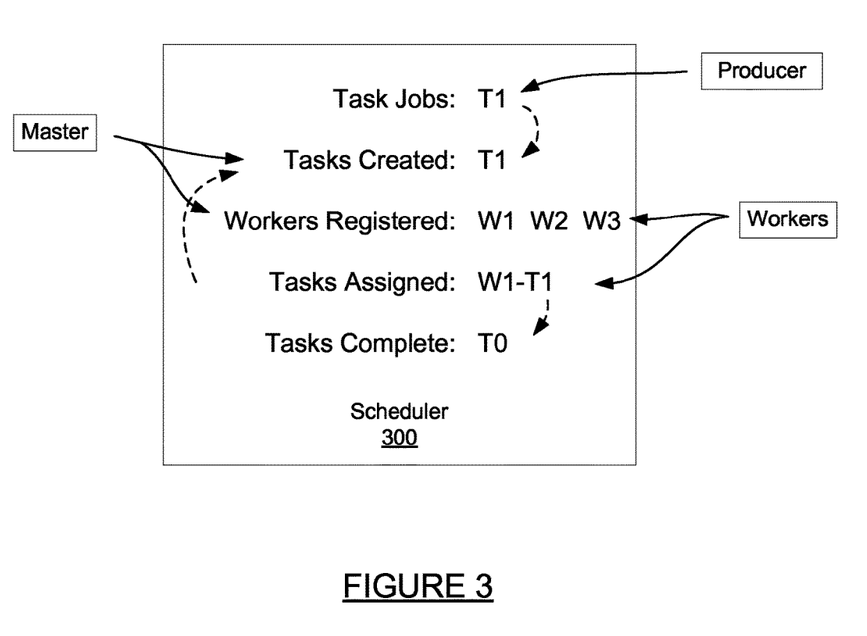
FIG. 3 is a logical view of a scheduler storage structure for tracking and processing tasks.

FIG. 3 is a logical view of a scheduler storage structure for tracking and processing tasks. The scheduler of FIG. 3 includes contexts, which may be implement it as folders, tables or other optical storage, of task jobs, tasks created, workers registered, tasks assigned, and tasks complete. When an anomaly occurs in the system of FIG. 2, such as for example a collector or an aggregator fails, a producer may detect the anomaly which is indicated by a task indicator being placed in the context of task jobs. In FIG. 3, a task indicator of "T1" is placed in the task jobs context to indicate that a new task T1 needs be created. All producers the present system will detect the new task request and attempt to create the task. Because all producers try to create the task, there is no single fail point in the present system for creating a task. Once the task is created, a quorum is notified and prevents other producers generating a task, and a task identifier created in the task jobs context is then moved to the tasks created context. An illustration of FIG. 3, the task identifier for T1 is moved task jobs to tasks created by the producer.

A master operates to view tasks and workers on an ongoing basis and matches created tasks to an available worker. There may be a plurality of masters in a scheduler system, with each scheduler having an identifier. The master with the lowest identifier is determined to be the active master. When the active master crashes or otherwise does not work properly, the master with the next lowest identifier becomes the active master.

When the master assigns a task to a particular worker, that correlation is provided in the tasks assign context. In in FIG. 3, the master assigned task one to worker W1. When a workers registered with the present system, a worker identifier may be placed within the workers registered context as well as the tasks assign context, and the worker subscribes to a Q associated with tasks assigned to that worker. When a task is assigned to a particular worker by the master, the corresponding task is notified and the worker may begin working on the task. If the worker completes the task, the task is moved from a context of tasks assigned to tasks complete. In FIG. 3, the tasks complete includes only a single task T0.

If a worker fails or is unresponsive at some point after the task is assigned to the worker before the task be complete, a scheduler will eventually detect the unresponsive worker from periodic polling of the worker. Once the worker is determined to be unavailable, the worker is removed from the workers registered context. The master consistently poles the tasks created and workers registered contexts. When a worker is determined to have failed and is no longer listed in the workers registered context, the master will search the tasks assign context to see if there were any tasks associated with the worker that recently failed. If so, the master will reassign those tasks to a different worker.

Figure 4:
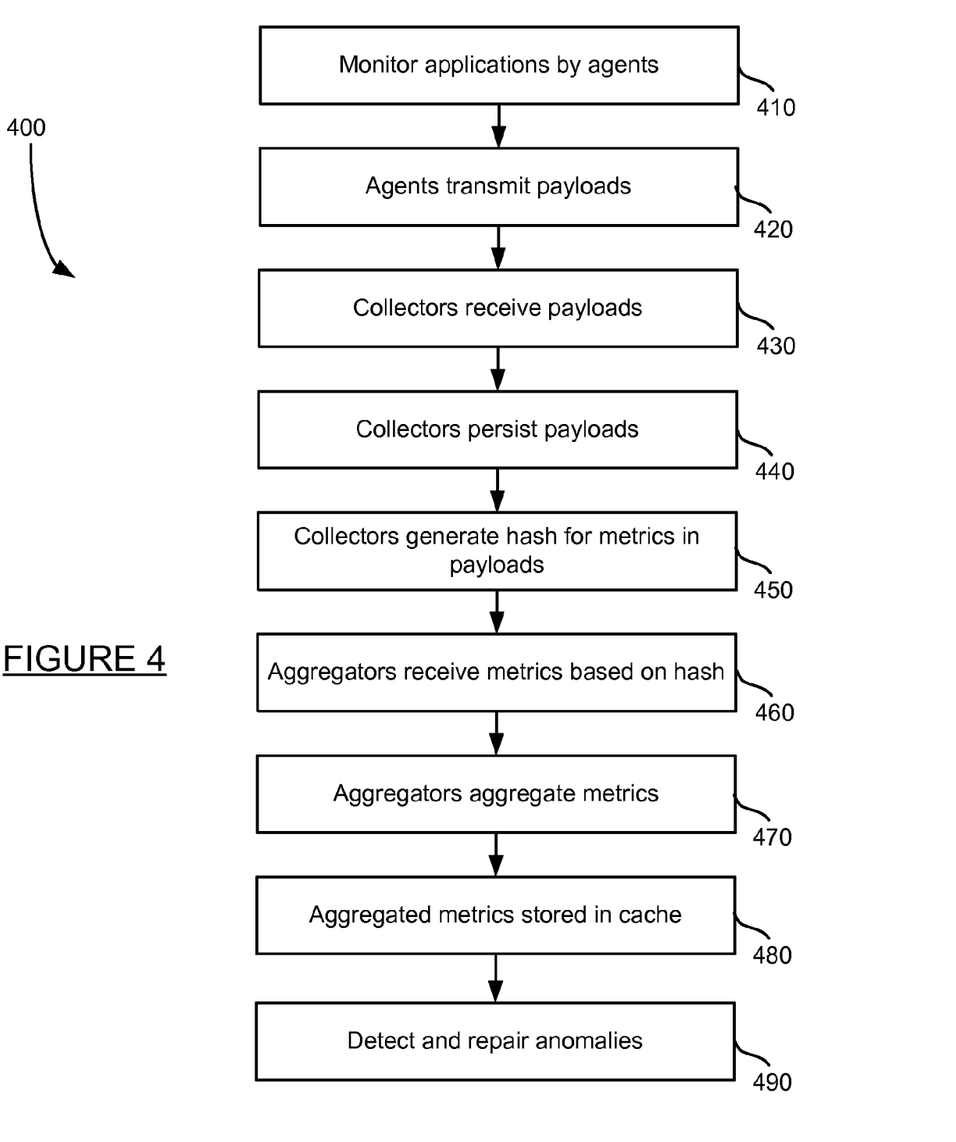
FIG. 4 is a method for collecting and aggregating metrics.

FIG. 4 is a method for collecting and aggregating metrics. First, applications are monitored by agents at step 410. The agents may collect information from applications and generate metric data. The agents may then transmit payloads to one or more collectors at step 420. The payloads may include metric information associated with the applications and other code being monitored by the particular agent. The payloads may be sent periodically from a plurality of agents to one or more collectors.

One or more collectors may receive the payloads at step 430. In some embodiments, a collector may receive an entire payload from an agent. The collectors persist the payload at step 440. To persist the payload, a collector may transmit the payload to a persistence store 230.

A collector may generate a hash for metric data within the payload at step 450. For example, for each metric, the collector may perform a hash on the metric type to determine a hash value. The same hash is performed on each metric by each of the one or more collectors. The metrics may then be transmitted by the collectors to a particular aggregator based on the hash value. Forwarding metric data to a particular aggregator of a plurality of aggregator is an example of the consistent logic that may be used to route metric data to a number of aggregators. Other logic to process the metric data may be used as well as long as it is the same logic applied to each and every metric.

The aggregators receive the metrics based on the hash value at step 460. For example, each aggregator may receive metrics having a particular range of hash values, the next aggregator may receive metrics having a neighboring range of hash values, and so on until a ring is formed by the aggregators to handle all possible hash values.

The aggregators then aggregate the metrics at step 470. The metrics may be aggregated to determine the total number of metrics, a maximum, a minimum, and average value of the metric. The aggregated metrics may then be stored in a cache at step 480. A controller or other entity may retrieve the aggregated metrics from the cache for a limited period of time.

Anomalies may be detected and repaired at step 490. Detecting an anomaly may include quorum detection and task generation and failover-proof task handling. More detail for detecting and repairing anomalies is discussed with respect to the method of FIG. 7.

Figure 5:
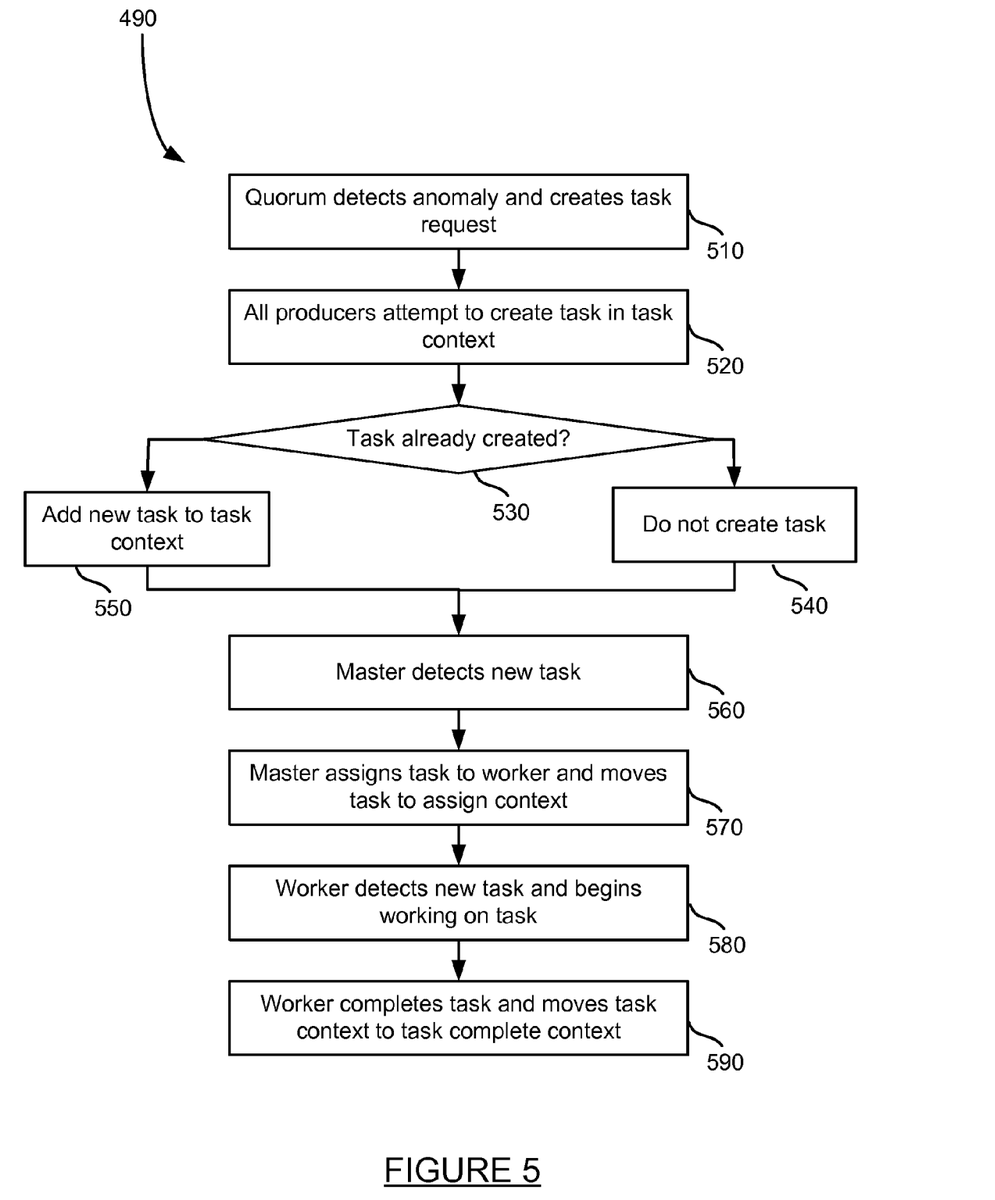
FIG. 5 is a method for detecting and repairing anomalies.

FIG. 5 is a method for upgrading an aggregator. The method of FIG. 5 provides more detail for step 490 the method of FIG. 4. First, an anomaly occurs at step 510. The anomaly may occur among the aggregators and collectors. For example, the anomaly may include a failure of a collector, a failure of, or failure of some other module. All producers may attempt to create a task associated with repairing the anomaly at step 522. The task creation may include placing a task identifier in a task context within the scheduler, where the persistent task and worker states are maintained. To create a task, a producer would query the quorum to determine if the task contexts was already created. Once the particular task is created, the quorum will not let another task be created with the same name as the created task. This allows all producers to attempt to create a task while allowing only one producer to be successful in creating a task, thereby avoiding a single point of failure.

A determination is made at step 530 as to whether the task has been created. If the task has been created, the producer may not create a new task at step 540 and the method continues to step 560. If a task has not already been created, a new task is created by adding a task identifier for the task to the task context at step 550. The method then continues to step 560.

A master detects a new task at step 560. The master detects changes in tasks and workers and may take action upon detecting a change each. After detecting the new task, the master may assign a task to a worker at step 570. When assigning the task to worker, the task is moved to the assign context in the queue of the particular worker. In some instances, the master will assign the task to a worker with available bandwidth to handle the task. In some instances, the master may use different factors to determine which worker to assign a task to.

A worker detects a new task in its queue and begins working on the task at step 580. Eventually, when the worker completes the task, the task identifier is moved from the assign context to the complete context. The lifecycle of the task is now complete.

Figure 6:
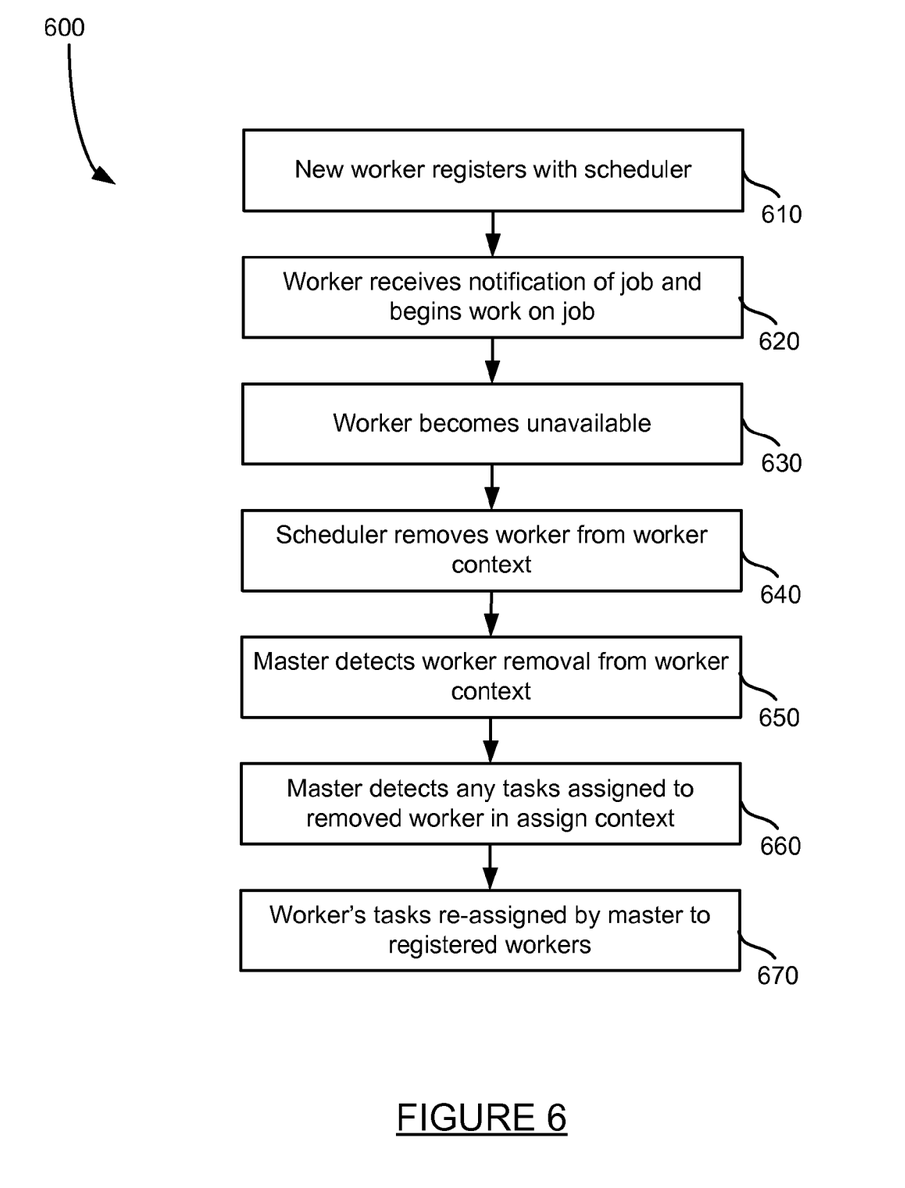
FIG. 6 is a method for managing tasks.

In some instances, a worker may fail after it has been assigned a task but before the task has been completed. FIG. 6 is a method for managing tasks when a worker has failed while handling a task. First, the new worker registers with the scheduler at step 610. When a worker is created, it registers a worker identifier with the scheduler. The scheduler places the worker identifier in the work context as well as the assign context. The worker receives a notification when a task is placed in the workers assigned queue, and begins working on the task at step 620.

Worker fails or otherwise becomes unavailable at step 630. When the worker becomes unavailable, eventually the scheduler will learn that the worker will not communicate with the scheduler. When this happens, the scheduler removes the worker identifier from the worker context at step 640. It is important to note that the scheduler does not remove the worker identifier from the assign context. Rather, the worker identifier remains in the assign context, along with any tasks assigned to that worker, so that those tasks can be reassigned by the master.

A master detects that a worker has been removed from the worker context at step 650. The master periodically checks the worker context to identify workers that have been added and removed from the worker context. Upon detecting a worker has been removed from the worker context, the master determines if any uncompleted tasks associated with that worker identifier are in the assign context at step 660. Tasks have not been completed if they are still in the assign context in a worker's queue and have not been moved to the work complete context.

If the master has detected tasks assigned to the removed worker identifier in the assign context, the tasks which are assigned to that worker identifier are reassigned by the master to other registered workers at step 670. Through this process, a failure of a worker results in no work left uncompleted. Rather, the entire structure of the scheduler in the persistent store maintains the task and worker states, including the workflow of the tasks with the workers, assignments, and completion contexts.

In some instances, when a worker becomes unavailable and is eventually restarted or otherwise reintroduced into the scheduler, the worker will not have the same worker identifier. Thus, a worker that was removed previously will not be able to continue to work on any uncompleted tasks. Rather, the worker is provided with a new identifier and is registered in the worker context and assign context with the new identifier.

Similarly, when a master fails and is re-introduced to the system, the master is provided with a new identifier.

Figure 7:
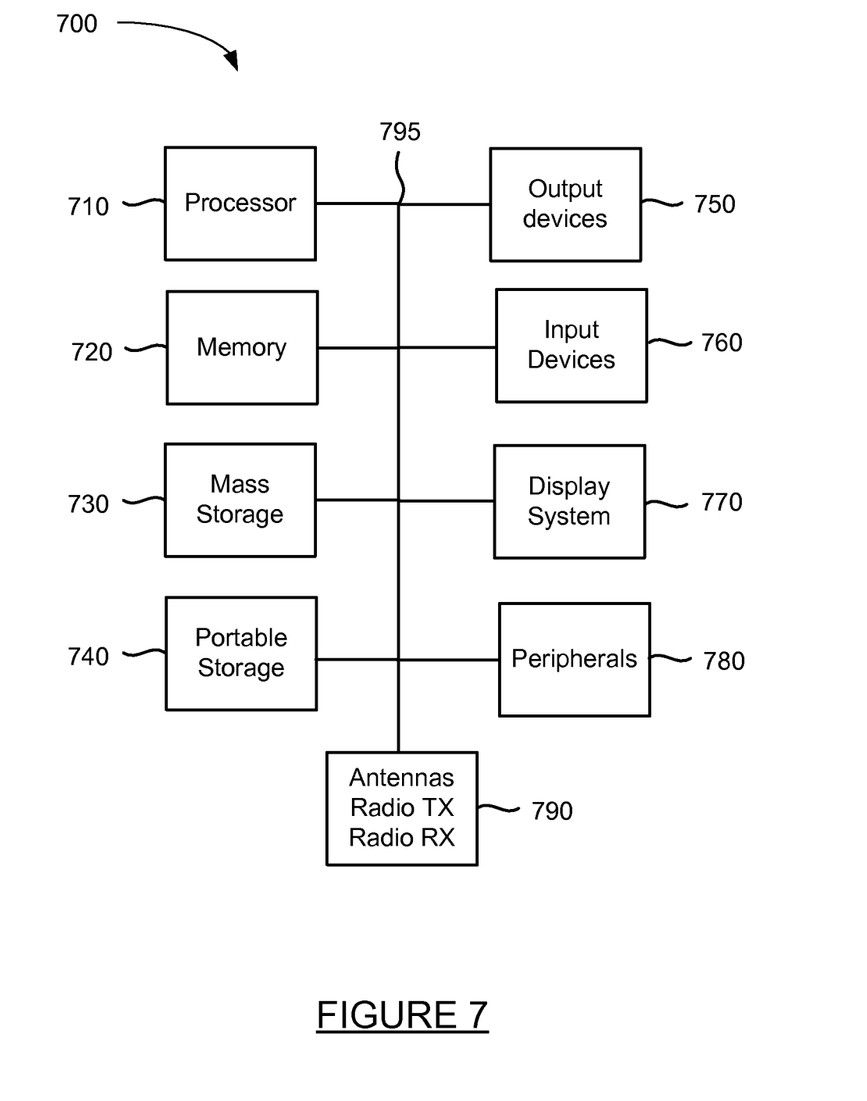
FIG. 7 is a block diagram of a system for implementing the present technology.

FIG. 7 is a block diagram of a system for implementing the present technology. System 700 of FIG. 7 may be implemented in the contexts of the likes of client computer 110, servers 130, 140, 150 and 160, collector(s) 170, and aggregator(s) 180. The computing system 700 of FIG. 7 includes one or more processors 710 and memory 720. Main memory 720 stores, in part, instructions and data for execution by processor 710. Main memory 720 can store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. However, the components may be connected through one or more data transport means. For example, processor unit 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive, an optical disk drive, a flash drive, or other device, is a non-volatile storage device for storing data and instructions for use by processor unit 710. Mass storage device 730 can store the system software for implementing embodiments of the present invention for purposes of loading that software into main memory 720.

Portable storage device 740 operates in conjunction with a portable non-volatile storage medium, such as a floppy disk, compact disk or Digital video disc, USB drive, memory card or stick, or other portable or removable memory, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, a pointing device such as a mouse, a trackball, stylus, cursor direction keys, microphone, touch-screen, accelerometer, and other input devices Additionally, the system 700 as shown in FIG. 7 includes output devices 750. Examples of suitable output devices include speakers, printers, network interfaces, and monitors.

Display system 770 may include a liquid crystal display (LCD) or other suitable display device. Display system 770 receives textual and graphical information, and processes the information for output to the display device. Display system 770 may also receive input as a touch-screen.

Peripherals 780 may include any type of computer support device to add additional functionality to the computer system. For example, peripheral device(s) 780 may include a modem or a router, printer, and other device.

The system of 700 may also include, in some implementations, antennas, radio transmitters and radio receivers 790. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth devices, and other radio frequency networks. The devices may include one or more radio transmitters and receivers for processing signals sent and received using the antennas.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, hand held computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method comprising:
   detecting, by a quorum, an anomaly among a group of collectors and aggregators in a network, the group of collectors configured to receive metric data from a plurality of agents on one or more remote servers in the computer network and the group of aggregators configured to receive one or more selected metrics from the one or more collectors;
   responsive to detecting the anomaly, causing a plurality of producers to initiate a repair task generation process;
   receiving, at the quorum, a query from at least one producer of the plurality of producers;
   determining, by the quorum, whether the repair task has already been generated by another producer of the plurality of producers;
   preventing, by the quorum, the at least one producer from generating the repair task when another producer of the plurality of producers has already generated the repair task;
   causing, by the quorum, the at least one producer to generate the repair task when another producer has not already generated the repair task;
   detecting that the repair task has been generated by at least one producer of the plurality of producers;
   assigning the generated repair task to a worker; and
   completing the generated repair task at the assigned worker.

2. The method of claim 1, wherein the status of the repair task is maintained in a persistent scheduler.

3. The method of claim 2, further comprising:
   registering the worker by adding a worker identifier to a worker context within the persistent scheduler; and
   adding the worker identifier to an assignment context, the repair task assigned to the worker in the assignment context.

4. The method of claim 3, further comprising:
   detecting that the worker is unavailable;
   removing the worker identifier from the worker context;
   maintaining the worker identifier and any task identifier associated with the worker identifier in the assignment context; and
   searching a task assign context to determine if any tasks associated with the unavailable worker have failed; and
   re-assigning any tasks that have failed to one or more other workers.

5. The method of claim 1, wherein detecting that the assigned worker is unavailable comprises:
   periodically polling the assigned worker to determine if the assigned worker is still available.

6. The method of claim 1, wherein each of the plurality of producers are implemented on each one of the group of collectors respectively, and wherein the worker is implemented on at least one aggregator of the group of aggregators.

7. The method of claim 1, wherein each of the plurality of producers that attempt to create the repair task are prevented from successfully generating the repair task after the repair task the quorum is notified that the repair task has been completed by the producer.

8. A non-transitory computer readable storage medium having embodied thereon a program, the program being executable by a processor to perform a method for processing metrics, the method comprising:
  detecting, at a quorum, an anomaly among a group of collectors and aggregators in a network, the group of collectors configured to receive metric data from a plurality of agents on one or more remote servers in the computer network and the group of aggregators configured to receive one or more selected metrics from the one or more collectors;
  responsive to detecting the anomaly, causing a plurality of producers to initiate a repair task generation process;
  receiving, at the quorum, a query from at least one producer of the plurality of producers;
  determining, at the quorum, whether the repair task has already been generated by another producer of the plurality of producers;
  preventing, at the quorum, the at least one producer from generating the repair task when another producer of the plurality of producers has already generated the repair task;
  causing, at the quorum, the at least one producer to generate the repair task when another producer has not already generated the repair task;
  detecting that the repair task has been generated by at least one producer of the plurality of producers;
  assigning the generated repair task to a worker; and
  completing the generated repair task at the assigned worker.

9. The non-transitory computer readable storage medium of claim 8, wherein the status of the repair task is maintained in a persistent scheduler.

10. The non-transitory computer readable storage medium of claim 9, further comprising:
  registering the worker by adding a worker identifier to a worker context within the persistent scheduler; and
  adding the worker identifier to an assignment context, the repair task assigned to the worker in the assignment context.

11. The non-transitory computer readable storage medium of claim 10, further comprising:
  detecting that the worker is unavailable;
  removing the worker identifier from the worker context;
  maintaining the worker identifier and any task identifier associated with the worker identifier in the assignment context; and
  searching a task assign context to determine if any tasks associated with the unavailable worker have failed; and
  re-assigning any tasks that have failed to one or more other workers.

12. The non-transitory computer readable storage medium of claim 8, wherein detecting that the assigned worker is unavailable comprises:
  periodically polling the assigned worker to determine if the assigned worker is still available.

13. The non-transitory computer readable storage medium of claim 8, wherein each of the plurality of producers are implemented on each one of the group of collectors respectively, and wherein the worker is implemented on at least one aggregator of the group of aggregators.

14. The non-transitory computer readable storage medium of claim 8, wherein each of the plurality of producers that attempt to create the repair task are prevented from successfully generating the repair task after the repair task the quorum is notified that the repair task has been completed by the producer.

15. A system, comprising:
  one or more network interfaces to communicate in a computer network;
  a processor coupled to the network interfaces and configured to execute one or more processes; and
  a memory configured to store a process executable by the processor, the process when executed operable to:
    detect, at a quorum, an anomaly among a group of collectors and aggregators in a network, the group of collectors configured to receive metric data from a plurality of agents on one or more remote servers in the computer network and the group of aggregators configured to receive one or more selected metrics from the one or more collectors;
    cause a plurality of producers to initiate a repair task generation process responsive to detecting the anomaly;
    receive, at a quorum a query from at least one producer of the plurality of producers;
    determine, at the quorum, whether the repair task has already been generated by another producer of the plurality of producers;
    prevent, at the quorum, the at least one producer from generating the repair task when another producer of the plurality of producers has already generated the repair task;
    cause the at least one producer to generate the repair task when another producer has not already generated the repair task;
    detect that the repair task has been generated by at least one producer of the plurality of producers;
    assign the generated repair task to a worker; and
    complete the generated repair task at the assigned worker.

16. The system of claim 15, wherein the status of the repair task is maintained in a persistent scheduler.

17. The system of claim 16, the one or more modules further operable to:
  register the worker by adding a worker identifier to a worker context within the persistent scheduler; and
  add the worker identifier to an assignment context, the repair task assigned to the worker in the assignment context.

18. The system of claim 17, the one or more modules further operable to:
  detect that the worker is unavailable;
  remove the worker identifier from the worker context;
  maintain the worker identifier and any task identifier associated with the worker identifier in the assignment context; and
  search a task assign context to determine if any tasks associated with the unavailable worker have failed; and
  re-assign any tasks that have failed to one or more other workers.

19. The system of claim 15, wherein one of the collectors implement each of the plurality of producers.

20. The system of claim 15, wherein each of the plurality of producers are implemented on each one of the group of collectors respectively, and wherein the worker is implemented on at least one aggregator of the group of aggregators.

21. The system of claim 15, wherein each of the plurality of producers that attempt to create the repair task are prevented from successfully generating the repair task after the repair task the quorum is notified that the repair task has been completed by the producer.

\* \* \* \* \*